United States Patent
Dashevskiy et al.

(10) Patent No.: US 11,985,152 B1
(45) Date of Patent: May 14, 2024

(54) APPLICATION BEHAVIOR DETECTION USING NETWORK TRAFFIC

(71) Applicant: T-Mobile USA, Inc., Bellevue, WA (US)

(72) Inventors: Tatiana Dashevskiy, Edmonds, WA (US); Dung Tan Dang, Kirkland, WA (US); Douglas Galagate, Bellevue, WA (US); Chuong Le Thanh Phan, Seattle, WA (US); Eric Yatskowitz, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 337 days.

(21) Appl. No.: 17/404,703

(22) Filed: Aug. 17, 2021

Related U.S. Application Data

(60) Provisional application No. 63/215,272, filed on Jun. 25, 2021.

(51) Int. Cl.
H04L 9/40 (2022.01)

(52) U.S. Cl.
CPC ...... H04L 63/1425 (2013.01); H04L 63/0435 (2013.01); H04L 63/168 (2013.01); H04L 63/20 (2013.01)

(58) Field of Classification Search
CPC . H04L 63/1425; H04L 63/0435; H04L 63/20; H04L 63/1416; H04L 63/1408; H04L 63/0227; G06F 21/554
See application file for complete search history.

(56) References Cited

U.S. PATENT DOCUMENTS

| | | | |
|---|---|---|---|
| 9,419,942 B1* | 8/2016 | Buruganahalli | H04L 63/06 |
| 11,265,339 B1* | 3/2022 | Mistry | H04L 63/1408 |
| 11,336,692 B1* | 5/2022 | McCorkendale | H04L 63/1441 |
| 2016/0080502 A1* | 3/2016 | Yadav | H04L 12/4633 709/227 |
| 2019/0012351 A1* | 1/2019 | Maor | G06F 21/00 |
| 2020/0195672 A1* | 6/2020 | Mugambi | H04L 63/308 |
| 2020/0221294 A1* | 7/2020 | Kang | H04W 12/35 |
| 2020/0387609 A1* | 12/2020 | Hansen | G06F 21/552 |
| 2021/0344607 A1* | 11/2021 | Sreevalsan | H04L 47/2483 |
| 2022/0303309 A1* | 9/2022 | Lee | H04L 63/1425 |

OTHER PUBLICATIONS

Jun et al., "Analysis for an intelligent behavior of encrypted network," 2020 International Conference on Big Data & Artificial Intelligence & Software Engineering (ICBASE) Year: 2020 | Conference Paper | Publisher: IEEE.*

Saber et al., "Encrypted Traffic Classification: Combining Over-and Under-Sampling through a PCA-SVM," 2018 3rd International Conference on Pattern Analysis and Intelligent Systems (PAIS) Year: 2018 | Conference Paper | Publisher: IEEE.*

* cited by examiner

*Primary Examiner* — Roderick Tolentino
(74) *Attorney, Agent, or Firm* — Lee & Hayes, P.C.

(57) ABSTRACT

Systems and methods for detecting application behavior using network traffic are described herein. The systems and methods enable a network to utilize network traffic data to determine various metrics and behavioral patterns associated with applications and their use. The patterns can be used to monitor traffic from a specific user device and across the network. Further, the information may be used to generate a trust score that provides a network and/or a user with information relating to an application.

20 Claims, 7 Drawing Sheets

APPLICATION BEHAVIOR DETECTION USING NETWORK TRAFFIC

CROSS REFERENCE TO RELATED APPLICATIONS

This application claims the benefit of U.S. Provisional Application No. 63/215,272 filed Jun. 25, 2021 entitled "Application Behavior Detection Using Network Traffic," which is incorporated herein by reference in its entirety.

BACKGROUND

For a significant portion of the population, applications, especially mobile application, have become the primary means in which users utilize their computing devices. A network operator may need to monitor its service to maintain or improve the customer experience. With the proliferation of applications available for use, there is an increasing chance that an application can operate abnormally, either through an error in the application or by design for nefarious reasons.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
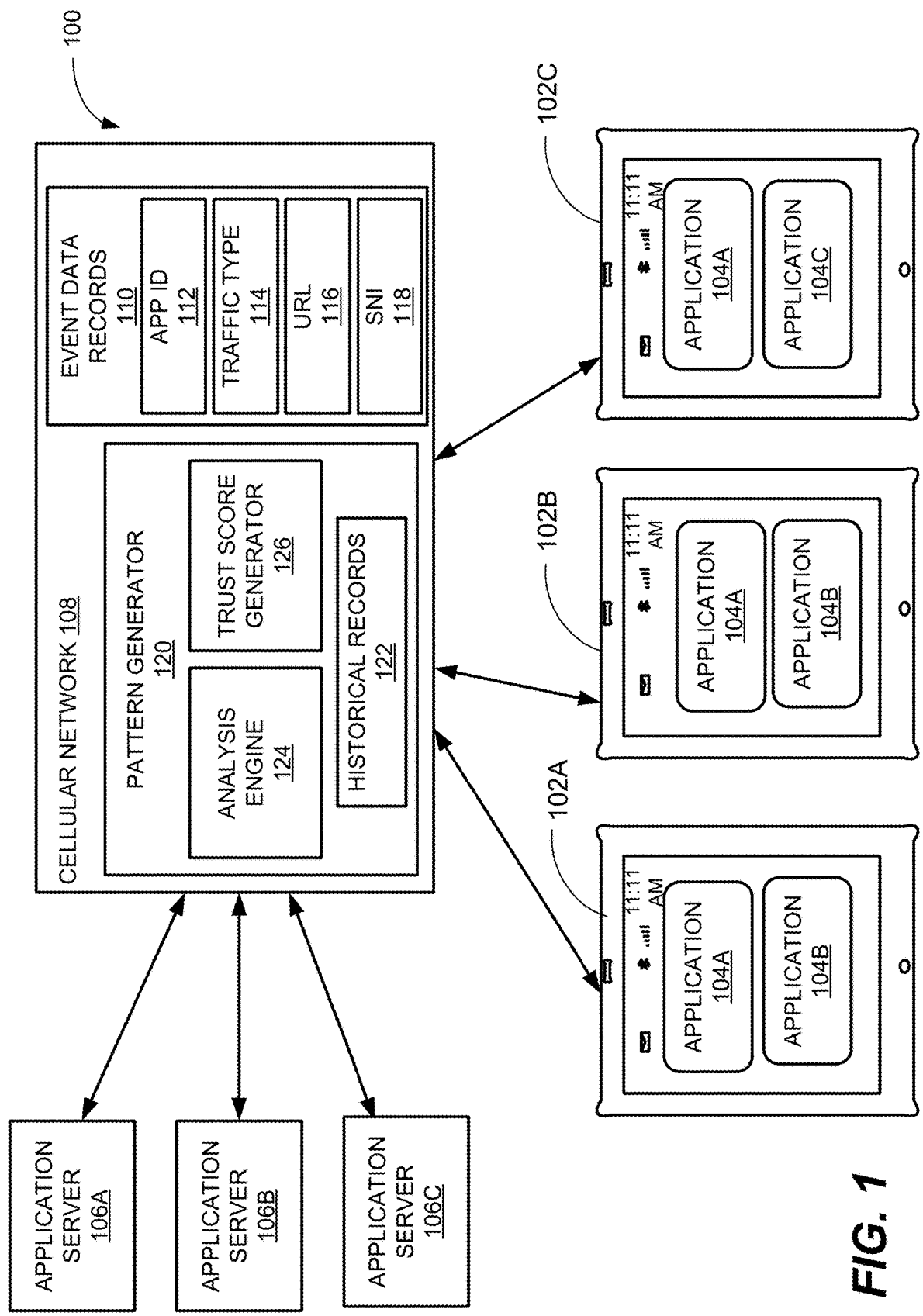
FIG. 1 depicts a system used to detect application behavior using network traffic, in accordance with some examples of the present disclosure.

Examples of the present disclosure can comprise systems and methods for detecting application behavior using network traffic. Network data is analyzed and collected across the network to create a "digital use fingerprint" for a particular application. The analyzed data can be used to provide various information that may be used to protect user devices and the network.

In conventional technologies, abnormal behavior is often analyzed at the application level. That is, the application may be analyzed for potential viruses or other malicious code prior to the acceptance in an application store. User devices may also have software installed, such as anti-virus software, that further monitor the application. These and other conventional systems can have several shortfalls. For example, conventional systems are constantly updated because new virus or malicious software is constantly being developed. Another limitation sometimes identified in conventional systems is that the application may not have "malicious" code, but operate in a manner that may be untrustworthy or unstable. Various aspects of the presently disclosed subject matter can help improve network traffic by identifying and filtering potentially harmful applications. In addition, various aspects of the presently disclosed subject matter can improve the use of an applications by a user by providing the user with an indication of potentially harmful applications and filtering traffic that may otherwise be transmitted without the user's permission, knowledge, or desire.

Various implementations of the presently disclosed subject matter improve upon conventional systems by analyzing network traffic behavior, and in some examples, provides indications to a user, the network, or other entity about the behavior. In some examples, using network traffic behavior can provide information not available when using conventional systems. For example, the information being transmitted may be encrypted. Attempts to decrypt the information to determine if the information is in accordance with what a user of the application expect may be impossible. In another example, user devices may not have installed thereon anti-virus or other similar software that may detect and stop malicious code from being executed on a user device.

Various implementations of the presently disclosed subject matter detect application behavior and store the behavior as application network behavior data. The application network behavior data for a particular application is collected across a network and analyzed to create a "digital fingerprint" for the particular application. The use of application network behavior data may have various advantages. For example, an application may be used by several users of the network. The application may have been deemed safe by an application store and anti-virus software installed on the various users' devices. However, the application network behavior data may indicate that the application is transmitting information at a time in which statistics indicate that the user is usually otherwise inactive (such as a time they are usually sleeping). Application network behavior data may be used to detect the transmission of data that is not typical of the application on other devices. For example, some developers create mobile apps designed to collect and leak private user data. This private user data can include information such as a username, user location, password, advertising identification, and user behavior. Some applications may be used to generate "bot" traffic associated with fake advertising clicks.

Various means may be used to generate application network behavior data for a particular application. For unencrypted traffic, using event data records, network data traffic is labeled and uniform resource locators ("URL") are extracted. Some examples of encrypted traffic include, but are not limited to, hypertext transfer protocol secure ("HTTPS"), secure socket layer ("SSL"), and transport layer security ("TLS"). For encrypted traffic, server name indication may be used, whereby the SNI are collected and the domain information is extracted. Application traffic behavior will be collected across the network to build time series data sets that indicate the number of requests to the same domain over a period of time. For both the unencrypted and encrypted traffic, the behaviors of applications can be used to create an expected behavior pattern. Anomalies in the behavior can be used to detected malfunctioning applications or applications that are using the network at unexpected times (e.g. an application having a hidden routine that uploads data to an unknown server at times the user is expected to be asleep).

As shown in FIG. 1, examples of the present disclosure can comprise a system 100 used to detect application behavior using network traffic. Illustrated in FIG. 1 are user devices 102A-102C (hereinafter referred to generically as "user devices 102," and individually as "user device 102A," "user device 102B," and the like). The user devices 102 have installed thereon Application 104A, the user device 102A and the user device 102B has installed thereon Application 104B, and the user device C has installed thereon Application 104C. Application 104A, the application 104B, and the application 104C are nonspecific applications that, when executed, cause the reception and transmission of data to and from the user device upon which the application is installed and executing. The data may be either encrypted or unencrypted data.

Also illustrated in FIG. 1 are application servers 106A-106C (hereinafter referred to generically as "application servers 106," and individually as "application server 106A," "application server 106B," and "application server 106C"). The application servers 106 are servers that provide data and receive data when the user devices 102 execute one or applications on the user devices 102. For example, the application server 106A is a server that serves various functions provided by the application 104A. The application server 106B is a server that serves various functions provided by the application 104B. The application server 106C is a server that serves various functions provided by the application 104B.

The application servers 106 may be accessed by the user devices 102 through the use of a cellular network 108. The cellular network 108 may be various types of networks that provide communication access between one or more of the user devices 102 and one or more of the application servers 106. It should be noted that presently disclosed subject matter is not limited to the use of cellular networks. The systems and methods discussed herein are discussed generally with respect to user devices 102 such as cellular UEs, tablets, computers, and the like, and in terms of components (e.g., network entities) associated with Wi-Fi networks, Bluetooth networks, wired networks, fourth-generation (4G) and fifth-generation (5G) cellular networks, and other types of networks. The systems and methods can be used with other types of equipment and on other types of networks, however, where users may wish to have increased flexibility in sending and receiving calls, video calls, and messages. Thus, the systems and methods described herein are described in terms of the 4G and 5G networks merely because these networks represent the state of the current art. One of skill in the art will recognize, however, the systems and methods could also be used on other networks that provide video calling such as, for example, Internet of Things (IoT), machine-to-machine (M2M), sixth-generation (6G), and other current and future networks.

Returning to FIG. 1, when one or more of the applications 104 are executed by the user devices 102, data is transmitted to the one or more application servers 106 through the cellular network 108. The transmission of data from and to the application servers is stored as event data records 110. The event data records 110 may be collected for the applications 104 executed by one or more of the user devices 102. The event data records 110 includes information such as app ID 112. The App ID 112 is an identification of one of more of the applications 104 stored in the event data records 110. The event data records 110 may also include traffic type 114. In the example of FIG. 1, there are two traffic types: encrypted data and unencrypted data. As used herein, "encrypted data" is data encrypted through at least a portion of the communication process from one or more of the user devices 102 to one or more of the application servers 106. As used herein, "unencrypted" data is data that is not encrypted through the communication process from one or more of the user devices 102 to one or more of the application servers 106. When either encrypted or unencrypted data is transmitted through the cellular network 108, the application ID 112 and the associated traffic type 114 are stored as event data records 110. In some examples, if the traffic type 114 is unencrypted, additional information may be stored, such as a uniform resource locator ("URL") 116 and a time when the URL 116 was requested. In some examples, if the traffic type 114 is encrypted, information such as a server name indication (SNI) 118, when the request to one or more application servers 106 was transmitted, and the like.

The SNI 118 may include information such as domain information, which can be extracted from the SNI 118. There may be various methods to extract an application name from encrypted traffic. For example, the SNI 118 for the applications 104 may be collected and stored. In many instances, a large percentage of the applications 104 have a periodic behavior with a period of twenty-four (24) hours. The periodic behavior is typically associated with the user behavior, as one or more of the applications 104 typically are not transmitting or requesting data during the night time and are active during the day. The time a particular SNI 118 was requested will be collected and stored.

A pattern generator 120 is invoked to determine a domain name from the SNI 118 behavior. A time series data set of SNI/domain and the number of requests across the cellular network 108 may be generated by the pattern generator. Filters, such as a low frequency Butterworth filter, may be applied. The pattern generator 120 will calculate domain metrics after applying the filter that characterize each domain, metrics such as amplitude, standard deviation, and the number of peaks. In some examples, a restriction may be placed on the domain metrics such as, but not limited to: period approximately or at twenty-four (24) hours, a standard deviation of amplitude and period less than five percent (5%), and the number of peaks will be filtered depending on the time window of the time series data. The filters and restrictions may significantly reduce the number of domains registered in the cellular network 108 and help detect domains that have a regular daily usage across the cellular network 108. Application names and a bundle application identification (ID) may be matched to the filtered domains. The behavior determined by the pattern generator 120 for a particular application may be stored as historical records 122.

The process can help project application usage in the cellular network 108, whereby application usage that is outside the expected usage may be tagged or identified as anomalous application usage using an analysis engine 124. The analysis engine 124. For example, if the pattern generator 120 determines that the behavior of the application 104A is such that ninety-nine percent (%) of the usage across the cellular network 108 is during a period of the day (e.g. from 6 AM to 10 PM local time of the application 104A), and the application 104A on the user device 102B is transmitting data or otherwise operating twenty percent (20%) of the time during the hours of 2 PM to 3 PM, with most of the data being transmitted during that time, the application 104A on the user device 102B may be analyzed or otherwise monitored more closely for potential malicious, unintended, or unexpected behavior. In some examples, applications exhibiting behavior that is not within an expected behavior pattern can be identified. In some examples, additional information may be retrieved by interacting with a user operating the user device 102, as illustrated by way of example in FIG. 2.

Figure 2:
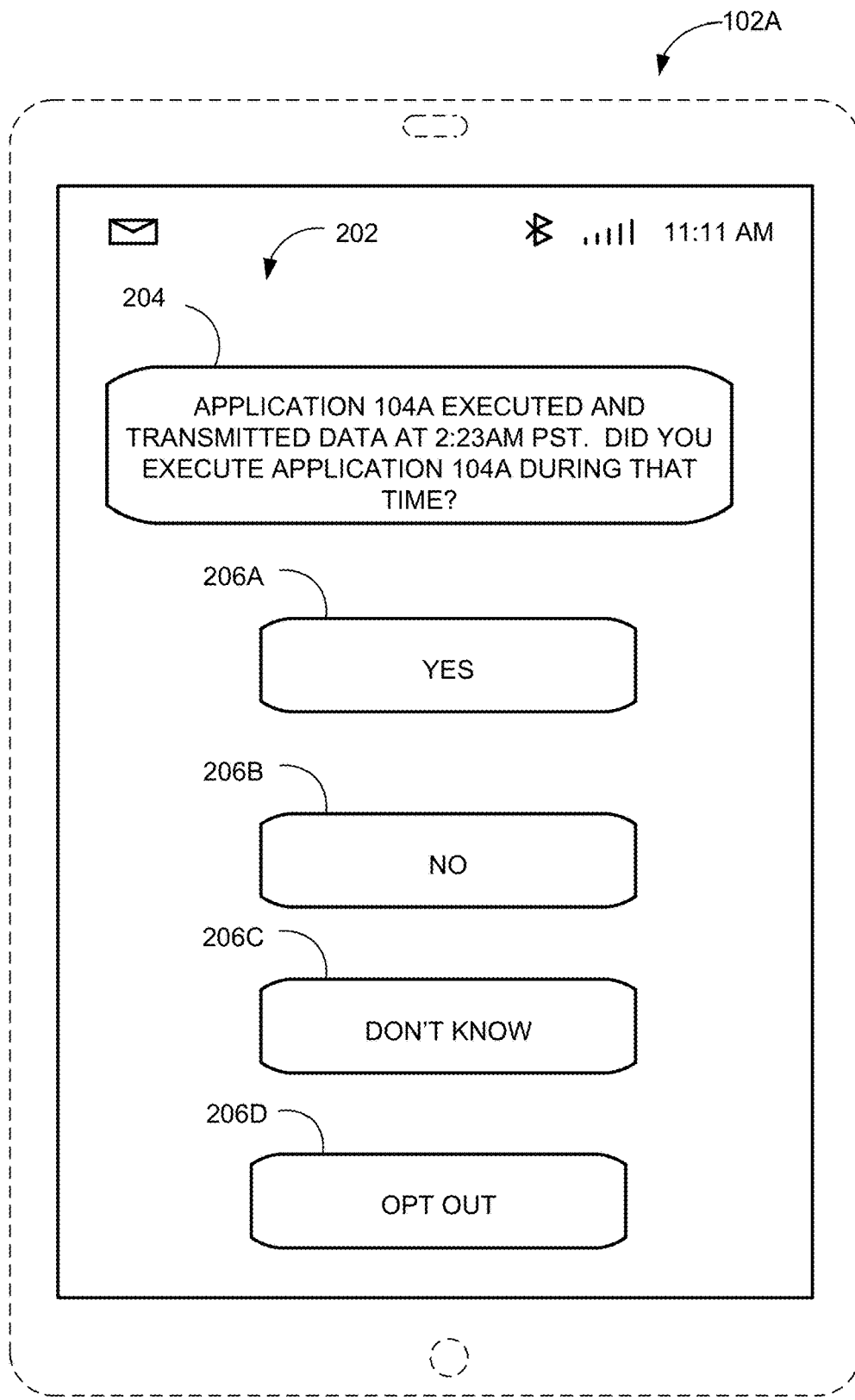
FIG. 2 depicts an example user interface for requesting additional information from a user, in accordance with some examples of the present disclosure.

FIG. 2 is an example user interface 202 for requesting additional information from a user. In the example illustrated in FIG. 2, the analysis engine 124 (or other similarly configured process or component) has determined that the application 104A operated in an anomalous behavior based on the historical records 122 associated with the application 104A. In the present example, the historical records 122 indicate that the application 104A typically executes and causes the transmission and receipt of data from 6 am local time to 11 pm local time of the user. Upon a detection of an anomalous data transmission, if more information is requested, needed, or desired, user interface 202 may be invoked at the user device 102A.

The user interface 202 may include an informational display 204 that informs the user of the reason for the user interface 202 being invoked. In the example illustrated in FIG. 2, it was detected that the application 104A executed and transmitted data at 2:23 AM PST (local time of the user). The informational display 204 may further include a question or query of the user. In the example illustrated in FIG. 2, the query is, "Did you execute application 104A during that time?". To respond to the query presented in the informational display 204, answer interfaces 206A-206D may be provided. The answer interfaces 206 may include a YES interface 206A to signify an affirmative answer to the query, a NO interface 206B to signify a negative answer to the query, a DON'T KNOW interface 206C to signify that the user is unsure of the answer to the query, and an OPT OUT interface 206D to signify that the user desires to not answer the query. Once an input to the answer interfaces 206A is received, the information may be transmitted to the cellular network 108 to provide additional data for the analysis engine 124.

Returning to FIG. 1, in some examples, it may be a desired or necessary feature to provide a user of a device an analysis of an application that may be used. In some examples, a "trust score" may be generated using a trust score generator 126. As used herein, a "trust score" may be qualitative or quantitative assessment of an application based on various parameters. For example, a trust score may be a score that indicates how the application behaves within expected parameters across the network. In this example, if five percent (5%) of the installations of a particular application operate outside expected parameters, the trust score may be lower than an application whereby only one percent (1%) of the installations operate outside of expected parameters.

In another example, a trust score may be based on the amount of data transmitted that is not expected. For example, some developers created mobile applications with the purpose of collecting and leaking private user data. The private user data can include, but is not limited to, sensitive user information such as username, user location, password, advertising id and user behavior. Some applications installed on devices or otherwise available may be applications designed to generate automatic or "bot" traffic associated with fake advertising clicks. Others use application to generate bot traffic associated with fake advertising clicks.

A trust score may be developed using various analytical technologies. In one example, network data stored in the historical records 122, such as event data records (EDR) may be used for detecting application usage, such as the application 104A, in the cellular network 108. Once the application 104A is detected, a quality test of running applications 104A may be performed. Using the historical records 122 of the data across the cellular network 108 can provide for the characterization of behavior patterns and assign trust score. If the behavior is abnormal, the application will be scored accordingly.

In some examples, if a trust score falls below or meets a certain threshold or value, the application and its traffic on the network may be affected. For example, if the trust score is below a certain threshold, the application may be monitored on cellular network 108 at a heightened level. In other examples, if the trust score is below a certain threshold, the application traffic may be throttled or blocked. In other examples, if the trust score is below a certain threshold, the application traffic may be placed on a lower priority.

Figure 3:
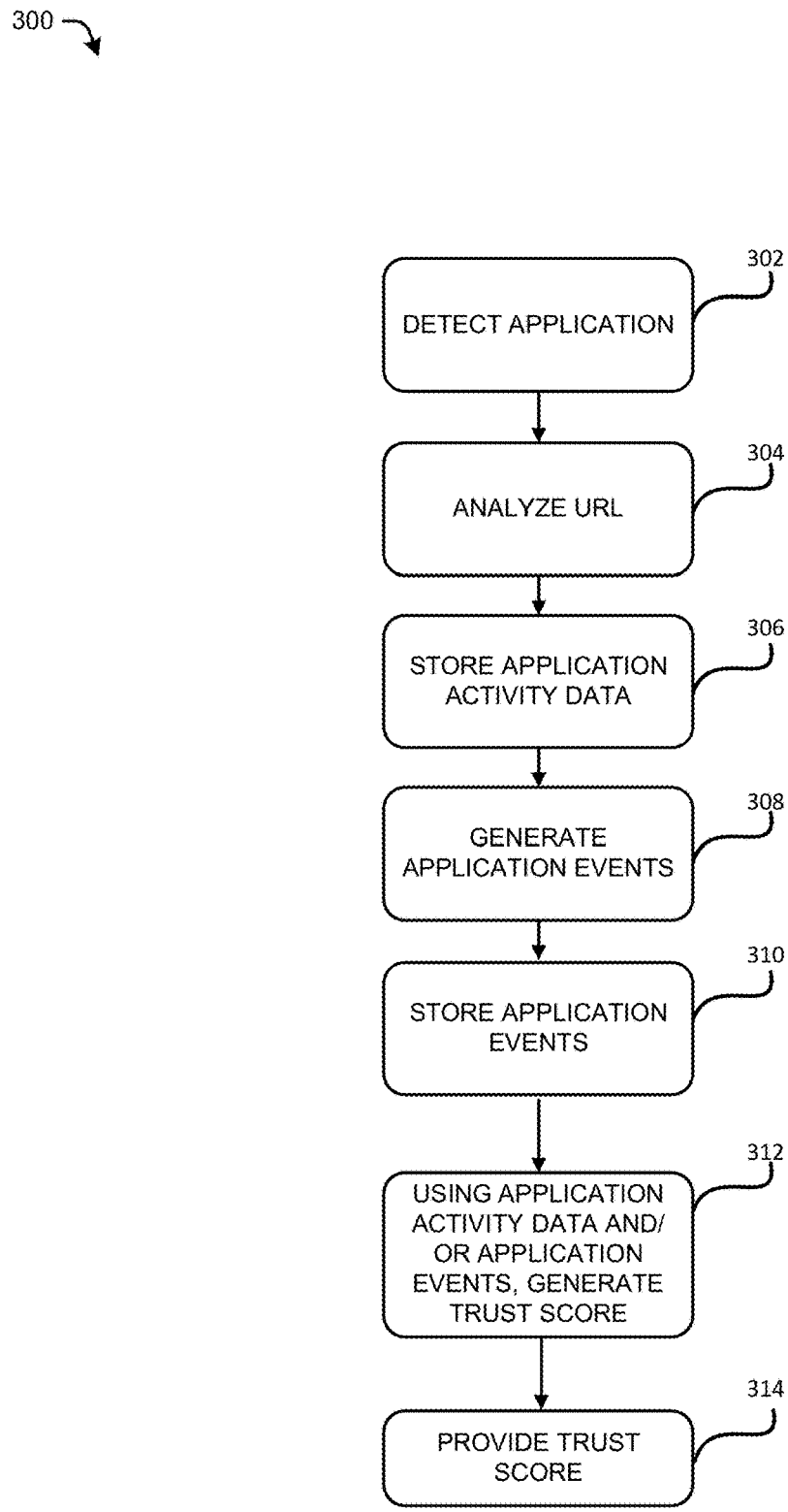
FIG. 3 is an illustrative process for determining a trust score, in accordance with some examples of the present disclosure.

FIG. 3 is an illustrative process 300 for determining a trust score. The process 300 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Some applications leak information because the application is unencrypted, or application was used as a publisher of advertising via unencrypted traffic. The process can provide for the detection of the name of an active application in the cellular network 108, and in some examples, collect information related to the content type of the application, such as ads, video, image, text files, and the like.

The process 300 commences at operation 302, where an application, such as the application 104A, is detected. Some applications leak information due to the unencrypted nature of the application, or an application may leak because the application is being used as a publisher of advertising via unencrypted traffic.

The process 300 continues to operation 304, where the URL of the application 104A is analyzed. The URL will be analyzed to determine if the URL includes information such as an application ID or a called bundle ID depending on the particular source from which the application 104A was made available.

The process 300 continues to operation 306, where the application ID or the called bundle ID is stored and labeled as application activity in the historical records 122.

The process 300 continues to operation 308, where the activity of the application 104A is analyzed to generate network-related events associated with the application 104A, events such as hits, total bytes, the time when an event was registered, and the content type. In some examples, if the application 104A is encrypted, the event and application activity may be characterized and labeled using the server name identifier (SNI), a certificate associated with the SNI, and/or a destination IP address.

The process 300 continues to operation 310, where the events are stored in the historical records 122.

The process 300 continues to operation 312, where using the application activity data and/or the application events, a trust score is generated. The trust score may be generated using various information. For example, a trust score may be generated using the following information: Sample Entropy Analysis for the application 104A, a Shannon Entropy calculated for the application 104A, the Total number of clicks registered in the cellular network 108, Total volume (bytes), Total number of user devices 102 using the application 104A, a location where the application 104A was requested, an IP destination analysis, and the type of the traffic which associated with the application 104A (e.g. video, image, streaming, text, JavaScript Object Notation (json), and the like). In addition, a Butterworth filter may be used to remove noise from time series data associated with each application, such as the application 104A, registered in the cellular network 108. The use of a Butterworth filter may provide for the approximation of Period and Amplitude, thus characterizing the application 104A behavior and generate a corresponding irregularity score. IN some examples, an irregularly score may be found using Equation 1, below:

$$IrSr = |P_{n+1} - P_n|/P_n \qquad \text{Equation 1}$$

where P is the period or the amplitude of the event n, and n is limited by $\{1, N\}$, where N is total number of peaks in time series data.

The information discussed above may be combined in various fashions to provide a metric that describes the application 104A behavior on the cellular network 108. The final determination may be the trust score.

The process 300 continues to operation 314, where the trust score is provided to various systems, processes, or devices. For example, the trust score may be provided to the application store from which the application 104A is made available for download. In some instances, application stores may require that the application 104A go through a rigorous form of testing that tests for, among other things, whether or not viruses are present, the stability of the application 104A and the like. However, the application score cannot test the use of the application on a cellular network-wide basis. The trust score may provide a more detailed indication of how the application 104A may operate rather than examining the application itself. In some examples, the trust score may be provided in some manner to a user, as illustrated by way of example in FIG. 4.

Figure 4:
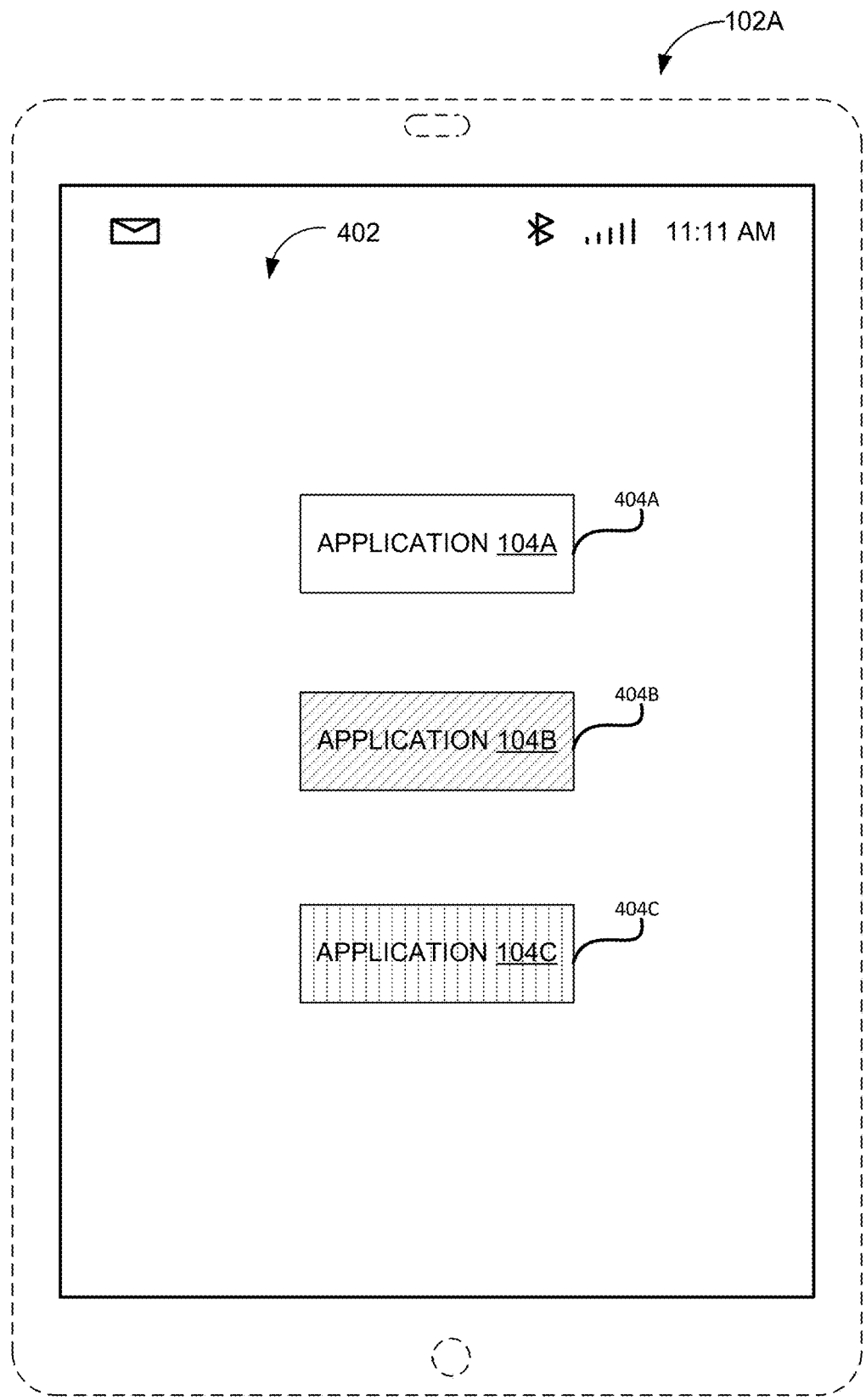
FIG. 4 depicts a user interface that may be rendered or displayed in the user device to provide a user with information relating to a trust score, in accordance with some examples of the present disclosure.

FIG. 4 is a user interface 402 that may be rendered or displayed in the user device 102A to provide a user with information relating to a trust score. Illustrated in the user interface 404 are icons 404A-404C. The icons 404A-404C are selectable icons that, once an input is received from a user, the particular application 104 associated with the icon 404A-404C is executed. For example, if an input is received at the icon 404A, the user device 102 executes the application 104A. In FIG. 4, the icons 404A-404C are graphically rendered to indicate different trust scores for the particular application.

For example, a high trust score may result in no graphical modification to the icons 404A-404C. In another example, a moderate trust score may result in a graphical modification as illustrated by the icon 404B associated with the application 104B. In a similar fashion, a low trust score may result in a graphical modification as illustrated by the icon 404C associated with the application 104C. The trust score and/or an instruction may be transmitted to the user device 102A to cause the visual or graphical modification of an icon associated with a particular application. It should be noted that the graphical modifications and the types or levels of trust scores illustrated in FIG. 4 are merely exemplary and are not intended to limit the scope of the presently disclosed subject matter to the variances illustrated in FIG. 4.

Providing a graphical or other indication of a trust score to a user may provide various benefits. For example, a user may view a trust score and determine if the use of the application is worthwhile. Even though a trust score does not necessary mean that an application is a malicious, deceptive, or fraudulent application, the trust score may still indicate that there may be a high probability that the application is.

Figure 5:
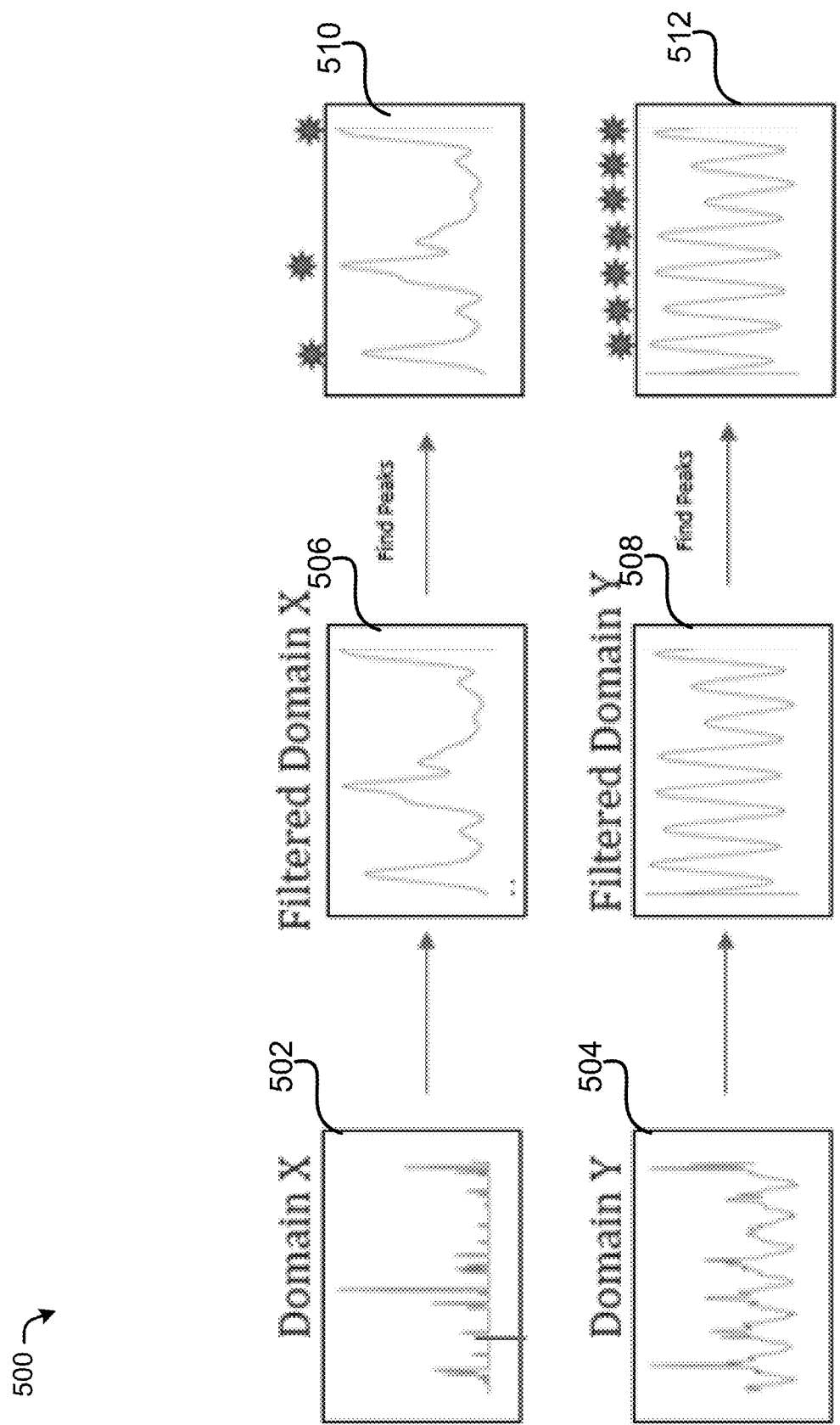
FIG. 5 is a graphical illustration showing how an application name may be extracted from encrypted traffic, in accordance with some examples of the present disclosure.

FIG. 5 is a graphical illustration showing how an application name may be extracted from encrypted traffic. In FIG. 5, the SNI are collected. For example, the SNI may be DLUO.REQUEST.CONTAINS.KASHA.COM. The time of the request may also be recorded, such as 2:00 GMT. From the SNI, the domain name may be extracted. For the present example, the extracted domain name is KASHA.COM.

A time series of data sets 500 of the SNI/Domain and the number of requests across the cellular network 108 per hour are collected to generate domain X 502 and domain Y 504. In the example illustrated in FIG. 5, a low frequency Butterworth filter is applied to create filtered domain X 506 and filtered domain Y 508. The use of a filter such as a Butterworth filter will provide for the ability to calculate metrics characterizing each domain: period, amplitude, standard deviation and number of peaks, illustrated in domain X peak graph 510 and domain Y peak graph 512.

Restrictions may be placed on domain metrics such as: period should be around 24 h, standard deviation of amplitude and a period of less than 5%, and number of peaks will be filtered depending on the time window of time series data. Such filters will significantly reduce the number of domains registered in the network and help to detect domains which have a regular daily usage across the network. Application names and bundle application ID will be matched to the filtered domains.

The use of generating patterns, such as the patterns illustrated in the domains of FIG. 5, can also be used to identify applications regardless of any nomenclature used. For example, a set of instructions may be included in an application that accomplishes various nefarious operations like security information leakage. The application with the set of instructions may be placed in an application store under various names. Thus, while an application name may be identified, if the pattern of behavior is not also identified, the mere exclusion of one application name may still allow for various other applications that also contain the same troublesome software. Further, the type of application into which the set of instructions is inserted may vary, such as a game, a music player, and the like. The use of behavioral patterns can help identify the set of instructions regardless of the type of application being executed.

Figure 6:
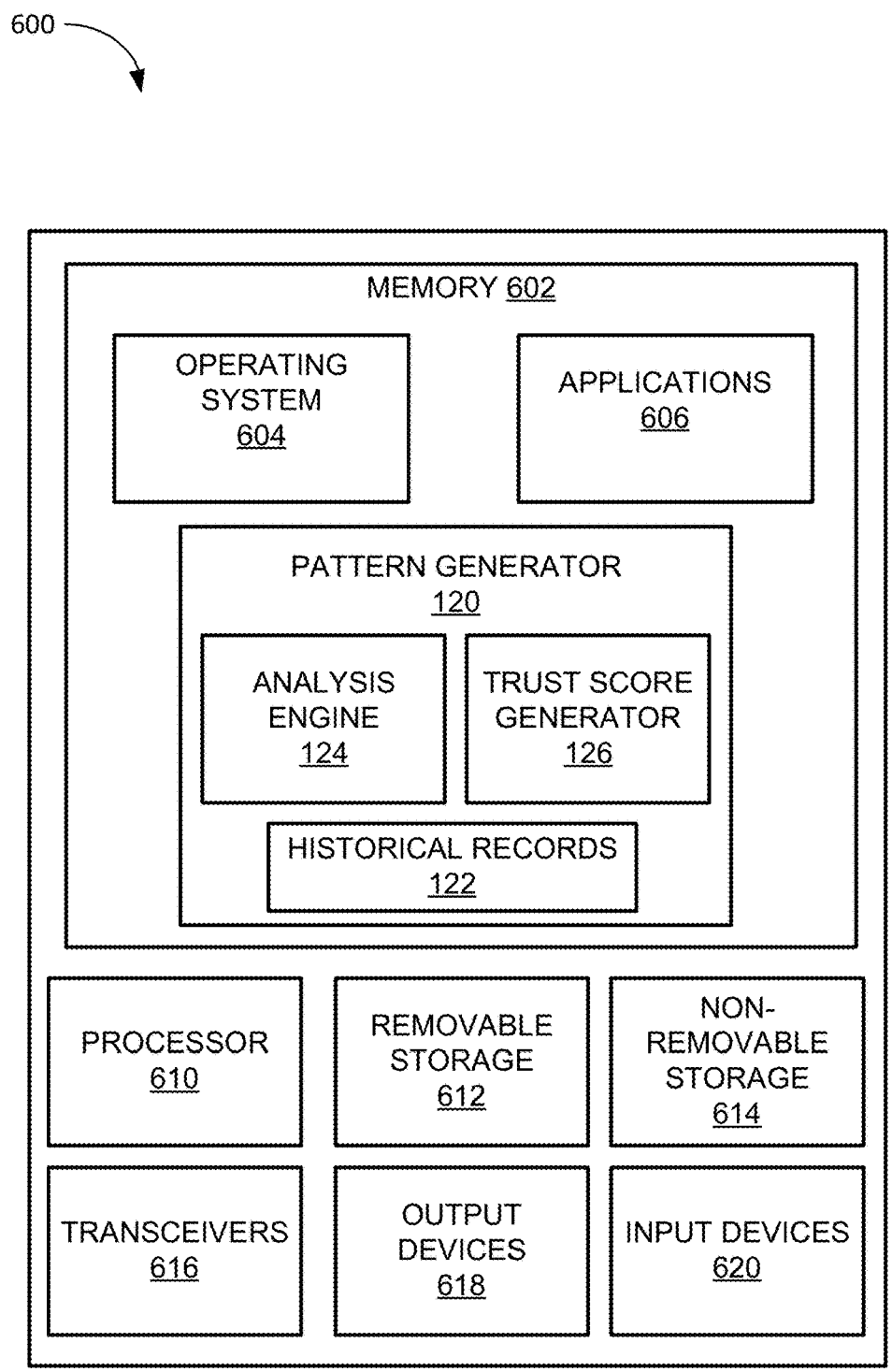
FIG. 6 depicts a component level view of an application behavior server computer 600 for use with the systems and methods described herein, in accordance with some examples of the present disclosure.

FIG. 6 depicts a component level view of an application behavior server computer 600 for use with the systems and methods described herein. The application behavior server computer 600 could be any device capable of providing the functionality associated with the systems and methods described herein. The application behavior server computer 600 can comprise several components to execute the above-mentioned functions. The application behavior server computer 600 may be comprised of hardware, software, or various combinations thereof. As discussed below, the application behavior server computer 600 can comprise memory 602 including an operating system (OS) 604 and one or more standard applications 606. The standard applications 606 may include applications that provide for communication with the cellular network 108, one or more of the application servers 106, and one or more of the user devices 102.

The application behavior server computer 600 can also comprise the pattern generator 120. The pattern generator 120 may receive various forms of information, such as event data records 110, and generate patterns associated with various applications, such as the applications 104. The types of patterns may vary. For example, as illustrated in FIG. 5, the patterns may be use patterns to help identify applications and associate the identified applications with various forms of behavior. The pattern generator 120 may include, but is not limited to, the historical records 122, the analysis engine 124, and the trust score generator 126.

The application behavior server computer 600 can also comprise one or more processors 610 and one or more of removable storage 612, non-removable storage 614, transceiver(s) 616, output device(s) 618, and input device(s) 620. In various implementations, the memory 602 can be volatile (such as random access memory (RAM)), non-volatile (such as read only memory (ROM), flash memory, etc.), or some combination of the two. The memory 602 can include all, or part, of the pattern generator 120, the historical records 122, the analysis engine 124, and the trust score generator 126. In some examples, rather than being stored in the memory 602, some, or all, of the pattern generator 120, the historical records 122, the analysis engine 124, and the trust score generator 126, and other information, can be stored on a remote server or a cloud of servers accessible by the application behavior server computer 600.

The memory 602 can also include the OS 604. The OS 604 varies depending on the manufacturer of the application behavior server computer 600. The OS 604 contains the modules and software that support basic functions of the application behavior server computer 600, such as scheduling tasks, executing applications, and controlling peripherals. In some examples, the OS 604 can enable the pattern generator 120, the historical records 122, the analysis engine 124, and the trust score generator 126, and provide other functions, as described above, via the transceiver(s) 616. The OS 604 can also enable the application behavior server computer 600 to send and retrieve other data and perform other functions.

The application behavior server computer 600 can also comprise one or more processors 610. In some implementations, the processor(s) 610 can be one or more central processing units (CPUs), graphics processing units (GPUs), both CPU and GPU, or any other combinations and numbers of processing units. The application behavior server computer 600 may also include additional data storage devices (removable and/or non-removable) such as, for example, magnetic disks, optical disks, or tape. Such additional storage is illustrated in FIG. 6 by removable storage 612 and non-removable storage 614.

Non-transitory computer-readable media may include volatile and nonvolatile, removable and non-removable tangible, physical media implemented in technology for storage of information, such as computer readable instructions, data structures, program modules, or other data. The memory 602, removable storage 612, and non-removable storage 614 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information and which can be accessed by the application behavior server computer 600. Any such non-transitory computer-readable media may be part of the application behavior server computer 600 or may be a separate database, databank, remote server, or cloud-based server.

In some implementations, the transceiver(s) 418 include any transceivers known in the art. In some examples, the transceiver(s) 616 can include wireless modem(s) to facilitate wireless connectivity with other components (e.g., between the application behavior server computer 600 and a wireless modem that is a gateway to the Internet), the Internet, and/or an intranet. Specifically, the transceiver(s) 616 can include one or more transceivers that can enable the application behavior server computer 600 to send and receive data using the cellular network 108. Thus, the transceiver(s) 616 can include multiple single-channel transceivers or a multi-frequency, multi-channel transceiver to enable the application behavior server computer 600 to send and receive video calls, audio calls, messaging, etc. The transceiver(s) 616 can enable the application behavior server computer 600 to connect to multiple networks including, but not limited to 2G, 3G, 4G, 5G, and Wi-Fi networks. The transceiver(s) can also include one or more transceivers to enable the application behavior server computer 600 to connect to future (e.g., 6G) networks, Internet-of-Things (IoT), machine-to machine (M2M), and other current and future networks.

The transceiver(s) 616 may also include one or more radio transceivers that perform the function of transmitting and receiving radio frequency communications via an antenna (e.g., Wi-Fi or Bluetooth®). In other examples, the transceiver(s) 616 may include wired communication components, such as a wired modem or Ethernet port, for communicating via one or more wired networks. The transceiver(s) 616 can enable the application behavior server computer 600 to facilitate audio and video calls, download files, access web applications, and provide other communications associated with the systems and methods, described above.

In some implementations, the output device(s) 618 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 618 can also include speakers, or similar devices, to play sounds or ringtones when an audio call or video call is received. Output device(s) 618 can also include ports for one or more peripheral devices, such as headphones, peripheral speakers, or a peripheral display.

In various implementations, input device(s) 620 include any input devices known in the art. For example, the input device(s) 620 may include a camera, a microphone, or a keyboard/keypad. The input device(s) 620 can include a touch-sensitive display or a keyboard to enable users to enter data and make requests and receive responses via web applications (e.g., in a web browser), make audio and video calls, and use the standard applications 606, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 620 and an output device 618.

Figure 7:
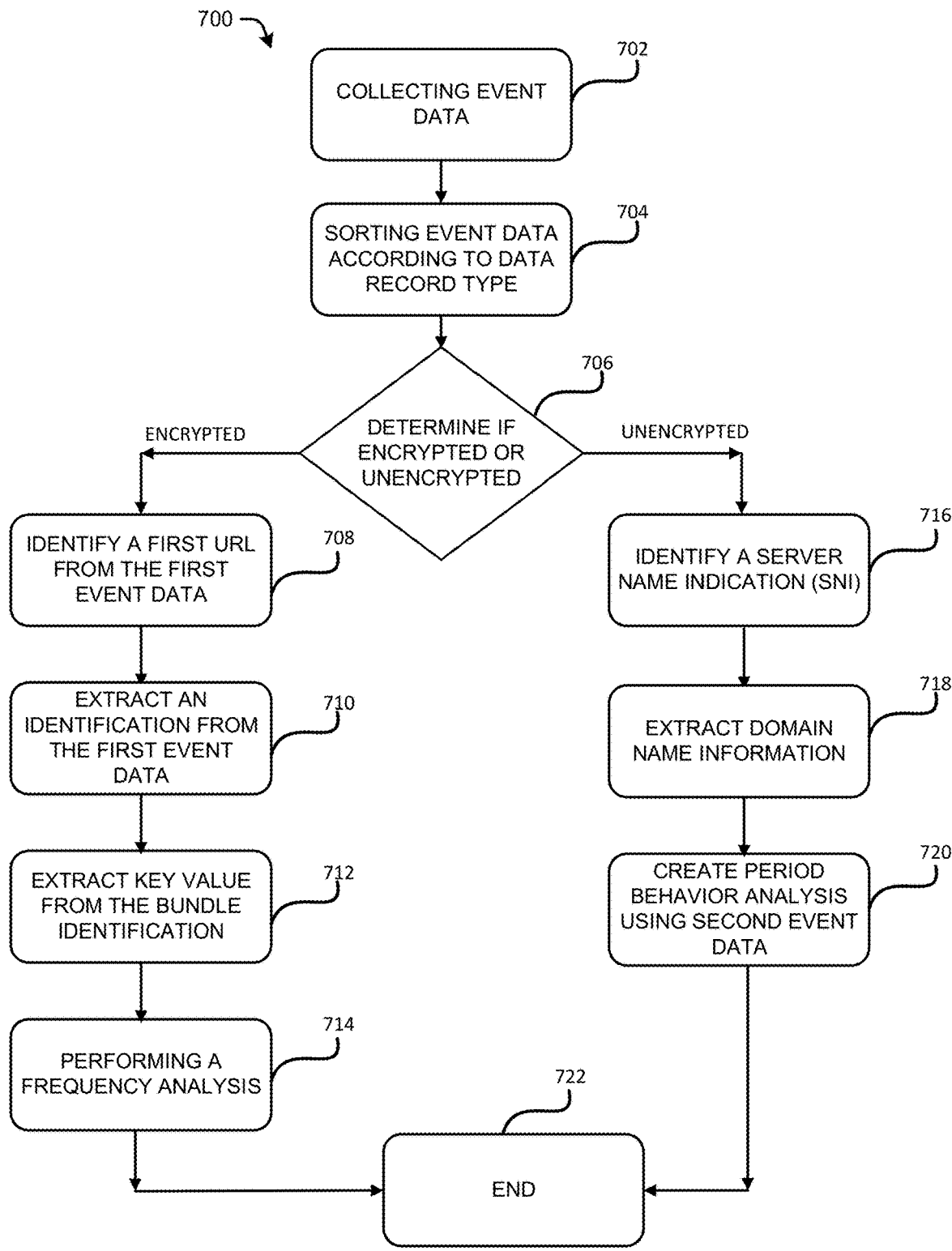
FIG. 7 is an illustrative process for detecting a use of one or more of the applications on the cellular network, in accordance with some examples of the present disclosure.

FIG. 7 is an illustrative process 700 for detecting a use of one or more of the applications 104 on the cellular network 108. The process 700 described in FIG. 7 may be used by the cellular network 108 to identify applications 104 that may be an issue or need to be monitored or removed from use. The process 300 described in FIG. 7 may also be used to provide additional information such as a trust score (described above).

The process 700 commences at operation 702, where event data is collected. The event data may be multiple event data from a mobile device. In some examples, the event data may include various data record types. The data record types may be encrypted or unencrypted network traffic. The event data may be stored as the historical records 122 of FIG. 1.

The process 700 continues to operation 704, where the event data is sorted according to the data record types. In one example, the historical records 122 may be sorted to indicate the event data associated with encrypted network traffic and event data associated with unencrypted network traffic.

The process 700 continues to operation 706, where, based on a determination of a first event data is encrypted traffic, the process 700 continues to operation 708 and, based on a determination that a second event data is unencrypted traffic, the process 700 continues to operation 716.

At operation 708, a first URL is identified from the first event data. At operation 710, an identification is extracted from the first event data, and, at operation 712, key values are extracted from a bundle identification of the first application. In some examples, the identification of operation 710 is the bundle identification.

The process 700 continues to operation 714, where a frequency analysis is performed. An example of a frequency analysis is provided by way of illustration in FIG. 5. As noted above, the frequency analysis may be used to build a time series data set that indicates a number of requests by the first application across the network. As described in FIG. 5, a low frequency filter may be applied to calculate at least one metric that characterizes a domain to remove noise from the frequency analysis. Some of these metrics may include, but are not limited to, period, amplitude, standard deviation, and number of peaks (as illustrated by way of example in FIG. 5).

If the data record type of a second event data is unencrypted, at operation 716, a server name identification of a second application is identified.

The process 700 continues to operation 718, where a domain name is extracted from the second event data using the SNI.

The process 700 continues to operation 720, where the second event data is monitored to create a period behavior analysis. The period behavior analysis may be used to identify behavior of the application that is anomalous to expected behavior. In some examples, the period behavior analysis may be compared to period behavior analysis generated from one or more second user devices 102.

In some examples, a sample entropy analysis may be performed on the event data and a trust score may be applied using various technologies and techniques described hereinabove. In some examples, network traffic may be filtered based on the trust score.

The process 700 may thereafter end at operation 722.

The presently disclosed examples are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method for detecting a use of an application on a network, the method comprising:
   collecting a plurality of event data of a mobile device comprising a plurality of data record types;
   sorting each of the plurality of event data according to the plurality of data record types;
   determining that a first event data of the plurality of event data, associated with a first application, comprises unencrypted traffic;
   based at least in part on the first event data comprising unencrypted data:
     identifying a first uniform resource locator from the first event data,
     extracting an identification from the first event data,
     extracting key values from a bundle identification, and
     performing a frequency analysis to allow filtering of the bundle identification from the event data;
   determining that a second event data of the plurality of event data, associated with a second application, comprises encrypted traffic; and
   based at least in part on the second event data comprising encrypted data:
     identifying a server name indication (SNI);
     extracting domain information from the second event data using the SNI; and
     monitoring a behavior of the second event data to create a period behavior analysis.

2. The method of claim 1, wherein the identification is the bundle identification.

3. The method of claim 1, wherein the period behavior analysis comprises SNI requests of the first application associated with a time period.

4. The method of claim 1, further comprising collecting and comparing the period behavior analysis of the first application on the mobile device to a plurality of second period behavior analyses for the first application on a plurality of second mobile devices.

5. The method of claim 1, further comprising using the period behavior analysis or the frequency analysis to build a time series data set indicating a number of requests by the first application or the second application across the network.

6. The method of claim 5, further comprising applying a low frequency filter to calculate at least one metric that characterizes a domain to remove noise from the period behavior analysis or the frequency analysis.

7. The method of claim 1, further comprising calculating a sample entropy analysis of the second application.

8. The method of claim 7, further comprising assigning a trust score to the second application based on the sample entropy analysis.

9. The method of claim 1, further comprising assigning a trust score to the second application by calculating a Shannon entropy, wherein if the trust score is below a threshold, traffic associated with the second application is throttled to reduce a bandwidth usage of the second application.

10. A non-transitory computer-readable storage medium having computer-executable instructions stored thereupon that, when executed by a computer, cause the computer to perform acts comprising:
    collecting a plurality of event data of a mobile device comprising a plurality of data record types;

sorting each of the plurality of event data according to the plurality of data record types;
determining that a first event data of the plurality of event data, associated with a first application, comprises unencrypted traffic;
based at least in part on the first event data comprising unencrypted data:
identifying a first uniform resource locator from the first event data,
extracting an identification from the first event data,
extracting key values from a bundle identification, and
performing a frequency analysis to allow filtering of the bundle identification from the event data;
determining that a second event data of the plurality of event data, associated with a second application, comprises encrypted traffic; and
based at least in part on the second event data comprising encrypted data:
identifying a server name indication (SNI);
extracting domain information from the second event data using the SNI; and
monitoring a behavior of the second event data to create a period behavior analysis.

11. The non-transitory computer-readable storage medium of claim 10, the computer-executable instructions further the computer to perform causing acts comprising:
collecting and comparing the period behavior analysis of the first application on the mobile device to a plurality of second period behavior analyses for the first application on a plurality of second mobile devices.

12. The non-transitory computer-readable storage medium of claim 10, the computer-executable instructions causing the computer to perform further acts comprising:
calculating a sample entropy analysis of the second application.

13. The non-transitory computer-readable storage medium of claim 12, the computer-executable instructions causing the computer to perform further acts comprising:
assigning a trust score to the second application based on the sample entropy analysis, wherein if the trust score of the second application is below a threshold, traffic associated with the second application may be blocked.

14. The non-transitory computer-readable storage medium of claim 10, the computer-executable instructions causing the computer to perform further acts comprising:
assigning a trust score to the second application by calculating a Shannon entropy.

15. The non-transitory computer-readable storage medium of claim 10, the computer-executable instructions further the computer to perform causing acts comprising:
assigning a trust score to the second application by identifying an abnormal behavior from the period behavior analysis.

16. The non-transitory computer-readable storage medium of claim 15, the computer-executable instructions further the computer to perform causing acts comprising:
filtering network traffic associated with the second application based on the trust score.

17. The non-transitory computer-readable storage medium of claim 16, the computer-executable instructions further the computer to perform causing acts comprising:
providing a user of the second application with an indication that the second application has been filtered based on the trust score.

18. The non-transitory computer-readable storage medium of claim 15, the computer-executable instructions further the computer to perform causing acts comprising:
providing a user of the second application with an indication of the trust score.

19. A system comprising:
a memory storing computer-executable instructions; and
a processor in communication with the memory, the computer-executable instructions causing the processor to perform acts comprising:
collecting a plurality of event data of a mobile device comprising a plurality of data record types;
sorting each of the plurality of event data according to the plurality of data record types;
determining that a first event data of the plurality of event data, associated with a first application, comprises unencrypted traffic;
based at least in part on determining that the first event data of the plurality of event data, associated with a first application, comprises unencrypted traffic:
identifying a first uniform resource locator from the first event data,
extracting an identification from the first event data,
extracting key values from a bundle identification, and
performing a frequency analysis to allow filtering of the bundle identification from the event data;
determining that a second event data of the plurality of event data, associated with a second application, comprises encrypted traffic; and
based at least in part on determining that the second event data of the plurality of event data, associated with a second application, comprises encrypted traffic:
identifying a server name indication (SNI);
extracting domain information from the second event data using the SNI; and
monitoring a behavior of the second event data to create a period behavior analysis.

20. The system of claim 19, further comprising computer-executable instructions for:
collecting and comparing the period behavior analysis of the first application on the mobile device to a plurality of second period behavior analyses for the first application on a plurality of second mobile devices; and
applying a low frequency filter to calculate at least one metric that characterizes a domain to remove noise from the period behavior analysis or the frequency analysis.

* * * * *